(12) United States Patent
Huhtala et al.

(10) Patent No.: US 12,471,707 B2
(45) Date of Patent: Nov. 18, 2025

(54) ATTACHMENT INTERFACE, AUTOMATED STORAGE SYSTEM, AND GRIPPER

(71) Applicant: Agora Networks Oy, Espoo (FI)

(72) Inventors: Ykä Huhtala, Espoo (FI); Kimmo Salonen, Espoo (FI)

(73) Assignee: Agora Networks Oy, Espoo (FI)

( * ) Notice: Subject to any disclaimer, the term of this patent is extended or adjusted under 35 U.S.C. 154(b) by 588 days.

(21) Appl. No.: 17/916,042

(22) PCT Filed: Mar. 3, 2021

(86) PCT No.: PCT/FI2021/050232
§ 371 (c)(1),
(2) Date: Sep. 30, 2022

(87) PCT Pub. No.: WO2021/198565
PCT Pub. Date: Oct. 7, 2021

(65) Prior Publication Data
US 2023/0147682 A1    May 11, 2023

(30) Foreign Application Priority Data
Mar. 31, 2020   (FI) ...................................... 20205323

(51) Int. Cl.
*B65G 1/04* (2006.01)
*A47B 96/06* (2006.01)

(52) U.S. Cl.
CPC .............. *A47B 96/067* (2013.01); *B65G 1/04* (2013.01)

(58) Field of Classification Search
None
See application file for complete search history.

(56) References Cited

U.S. PATENT DOCUMENTS

| | | | | |
|---|---|---|---|---|
| 3,252,614 | A | * 5/1966 | Evans | ................ B65D 21/0212 |
| | | | | 211/126.5 |
| 4,212,093 | A | 7/1980 | Lombard | |
| 4,373,642 | A | * 2/1983 | Wolters | ................ B65D 43/021 |
| | | | | 206/509 |
| 7,686,172 | B2 * | 3/2010 | Wisnoski | .............. A47F 5/0846 |
| | | | | 211/94.01 |
| 8,888,110 | B2 | 11/2014 | Sadeh et al. | |

(Continued)

FOREIGN PATENT DOCUMENTS

| | | |
|---|---|---|
| DE | 9206394 U1 | 7/1992 |
| DE | 102019211245 A1 | 2/2021 |

(Continued)

*Primary Examiner* — Mark C Hageman
(74) *Attorney, Agent, or Firm* — Laine IP Oy

(57) ABSTRACT

According to a first aspect of the present invention, there is provided a container for an automated storage system. The container has a base which extends across an area that has a center point and an imaginary center axis that extends through the center point. The container also has a casing with a bottom end connected to the base and a top end opposing the bottom end and defining an opening for accessing the container. The casing extends from the base in a direction which has a component parallel to the center axis. A rim extends from the second end of the casing away from the center axis. A bottom-facing skirt extends from the rim, whereby a gripping space is formed between the casing, rim and skirt of the container.

19 Claims, 8 Drawing Sheets

(56) References Cited

U.S. PATENT DOCUMENTS

| | | | |
|---|---|---|---|
| 10,639,800 B2 | 5/2020 | Kamranzadeh et al. | |
| 2005/0268548 A1 | 12/2005 | Lovette et al. | |
| 2005/0285001 A1* | 12/2005 | Timmerman | A47B 96/067 |
| | | | 248/312.1 |
| 2009/0232631 A1 | 9/2009 | Zenpo et al. | |
| 2016/0059421 A1 | 3/2016 | Sun | |
| 2019/0240831 A1 | 8/2019 | Bonora | |
| 2019/0382203 A1 | 12/2019 | Middelberg et al. | |
| 2020/0016770 A1 | 1/2020 | Kamranzadeh et al. | |

FOREIGN PATENT DOCUMENTS

| | | |
|---|---|---|
| EP | 2732926 A1 | 5/2014 |
| JP | H06316311 A | 11/1994 |
| WO | WO2004105560 A1 | 12/2004 |
| WO | WO2019150361 A1 | 8/2019 |
| WO | WO2020161385 A1 | 8/2020 |

* cited by examiner

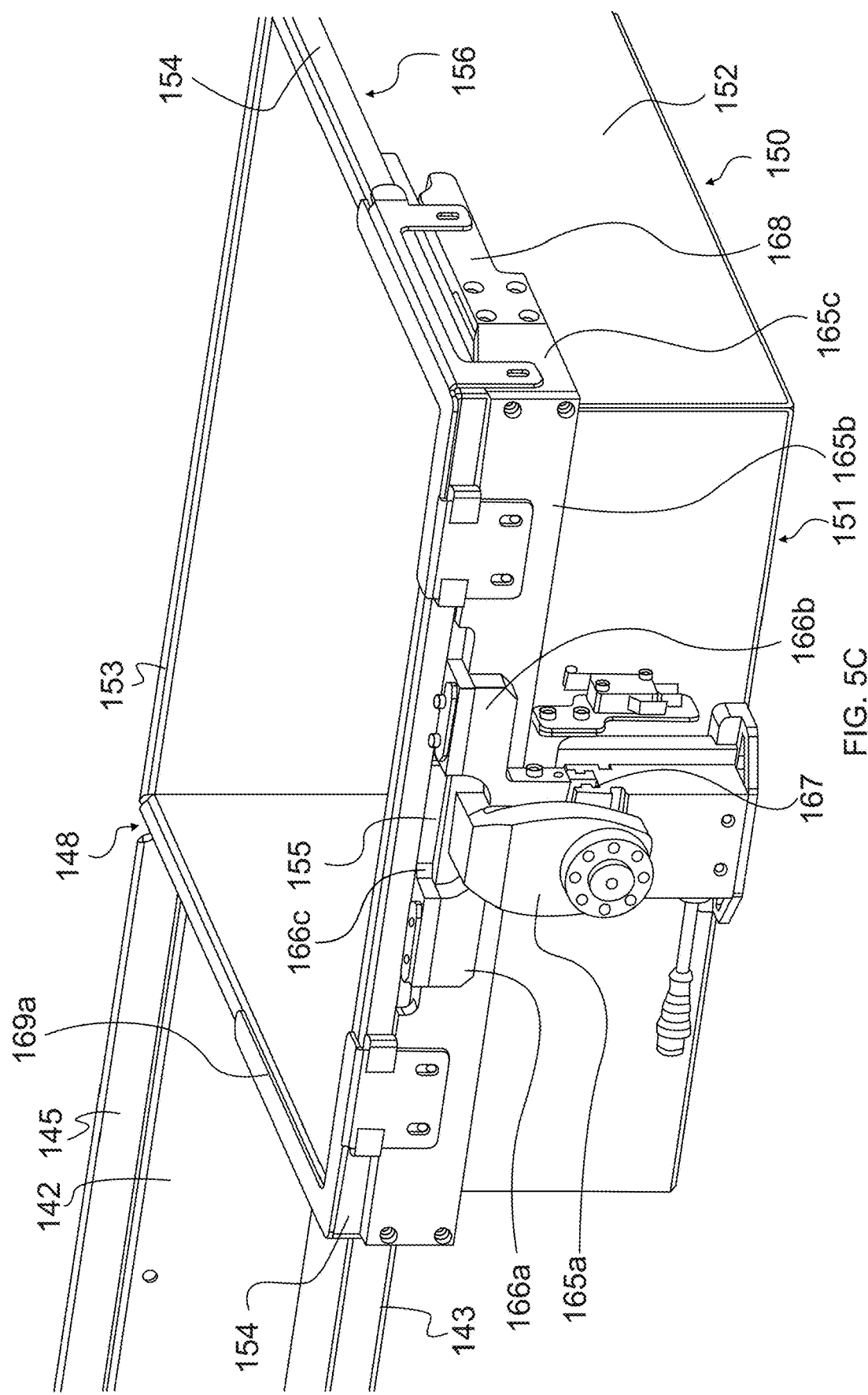

ATTACHMENT INTERFACE, AUTOMATED STORAGE SYSTEM, AND GRIPPER

FIELD

The present disclosure relates to devices for receiving, storing, and dispensing items as well as to methods for producing such devices or components thereof. In particular, the present disclosure relates to automated systems for storing articles, individually or in orderly arrangement, in warehouses or magazines.

BACKGROUND

With commerce moving ever more deeply and broadly online, the parcelled delivery of goods to the consumer has become the subject of great development. Typically, the item purchased online is delivered to the residence or place of employment of the consumer according to the order details. There are, however, problems associated with timing the receipt and delivery of the purchased item between the courier and the consumer. It is very common that the consumer is not available for receipt upon feasible delivery time or vice versa. The same problem is prevalent also in inter-consumer transactions. Several solutions have therefore been developed for storing the items in decentralized automated magazines that the items are delivered to and where item may be retrieved by the recipient at a convenient point in time. Such automated magazines are commonly provided with sophisticated user interfaces and backend systems that ensure that the person retrieving the parcel is duly notified of the availability of the parcel and that the person is entitled to access the parcel.

Conventional automated storage systems require relatively complex and precise componentry to work, including sophisticated sensors, machine vision, etc. to manipulate the containers used to hold the items inside the enclosure. It is therefore a challenge to design an automated storage system that can be made and maintained with relatively simple components that are suitable for mass production and servicing all around the world with a varying degree of expertise in robotic apparatuses.

SUMMARY

The invention is defined by the features of the independent claims. Some specific embodiments are defined in the dependent claims.

According to a first aspect of the present disclosure, there is provided a gripper for a robot of an automated storage system. The gripper is configured for selective gripping of a container and has a body configured for engagement of a top end of the container. The gripper has a slide lock which is provided to the body and configured to selectively secure the gripper to the top end of the container. The slide lock is configured to be inserted to a gripping space which is defined by a casing, a rim, and skirt of the container. The slide lock may be moved between a released configuration, in which the slide lock is disengaged from the tab, and a locked secured configuration, in which the slide lock is engaged to the tab.

According to a second aspect of the present disclosure, there is provided an attachment interface for attaching a container to a suspender of a shelfless support structure of an automated storage system. The shelfless support structure comprises a plurality of suspenders configured to be attached to and inside of an enclosure of the storage system in a mutually superposed configuration. The attachment interface has a gripping space which is defined by a casing, rim, and skirt of the container. The attachment interface also has a lip which is configured to be inserted to the gripping space of the container. The lip extends from a top end of a body of the suspender above and towards one side thereof. Each suspender comprises a plurality of notches provided to the lip for accommodating respective skirts of the plurality of containers. Each suspender comprises a shoulder for engaging casings of the plurality of containers. The shoulder extends from the bottom end of the body below and towards said one side thereof.

According to a third aspect of the present disclosure, there is provided an automated storage system with an enclosure a user interface provided to the enclosure and comprising selectively openable opening for the deposit and retrieval of items, a shelfless support structure as described above contained in the enclosure for storing a plurality of such containers, a plurality of containers as described above housed on the support structure for storing the items, and a robot provided to the inside of the enclosure for moving the containers between the port and the support structure, wherein the robot comprises an articulated arm and a gripper as described above disposed at a distal end of the articulated.

Various embodiments of the first, second, or third aspect may comprise one or more features from the following itemized list:
- the skirt comprises a tab extending in the same direction as the skirt;
- the dimension in which the skirt extends from the rim varies along the skirt;
- the container is generally prismatic;
- at least one such tab is provided on each side of the container;
- wherein the rim and skirt extend around the entire top end of the casing;
- the container is symmetrical about two mutually orthogonal symmetry axes extending across the container, when viewed along the center axis;
- the base is planar, whereby the imaginary center axis is a normal of the base;
- the skirt extends from the rim parallel to the center axis;
- the suspender comprises a plurality of notches provided to the lip for accommodating respective skirts of the plurality of containers;
- the locking mechanism comprises a slide lock which is provided movably to the body and configured to be inserted under a and skirt of the container and manipulated between a released configuration, in which the lock is disengaged from a tab on the skirt of the container, and a locked secured configuration, in which the lock is engaged to the tab;
- the slide lock is configured to slide along one side of the container;
- the gripper has a shape of a general C shape and is configured to engage three sides of the generally prismatic container;
- the body of the gripper comprises a transversal piece, which comprises the slide lock, for engaging one side of the generally prismatic container, and two longitudinal pieces, which extend from opposing ends of the transversal piece for engaging two respectively opposing sides of the generally prismatic container;
- the automated storage system comprises a vertically extending track and a carrier provided movably to the track, wherein the arm is attached at a proximal end to the carrier;

the enclosure has a quadrilateral cross-section;
the user interface is provided on a first side of the enclosure, the robot is provided on a second side of the enclosure opposing the first side, wherein a first such support structure is provided on a third side of the enclosure,
a second such support structure is provided on a fourth side of the enclosure opposing the third side.

Considerable benefits are gained with aid of the novel construction of the module. By providing a gripping space under a rim-skirt edge of the container, the container may be engaged with a very simple robotic gripper, one the one hand, and by an equally simple shelfless support structure on the other hand. Accordingly, an automated storage system may be provided with relatively simple components that are suitable for mass production and servicing thus making the system relatively robust.

Further benefits are gained with particular embodiments which are described in greater detail here after.

BRIEF DESCRIPTION OF THE DRAWINGS

In the following certain exemplary embodiments are described with reference to the accompanying drawings, in which:

FIG. 5C illustrates a perspective isolation view of the gripper of FIG. 5A locked to with the container.

EMBODIMENTS

In the present context, the various pieces of an exemplary automated storage system are discussed with reference to three Cartesian dimension, namely a first Cartesian dimension X, a second Cartesian dimension Y, and a third Cartesian dimension Z. In layman terms, the first dimension X may be understood as the width of a given piece, i.e. the extension of the piece between lateral sides. The second dimension Y may be understood as the height of the piece. The third dimension Z may be understood as the depth of the piece. These expressions are used interchangeably throughout this specification.

Figure 1:
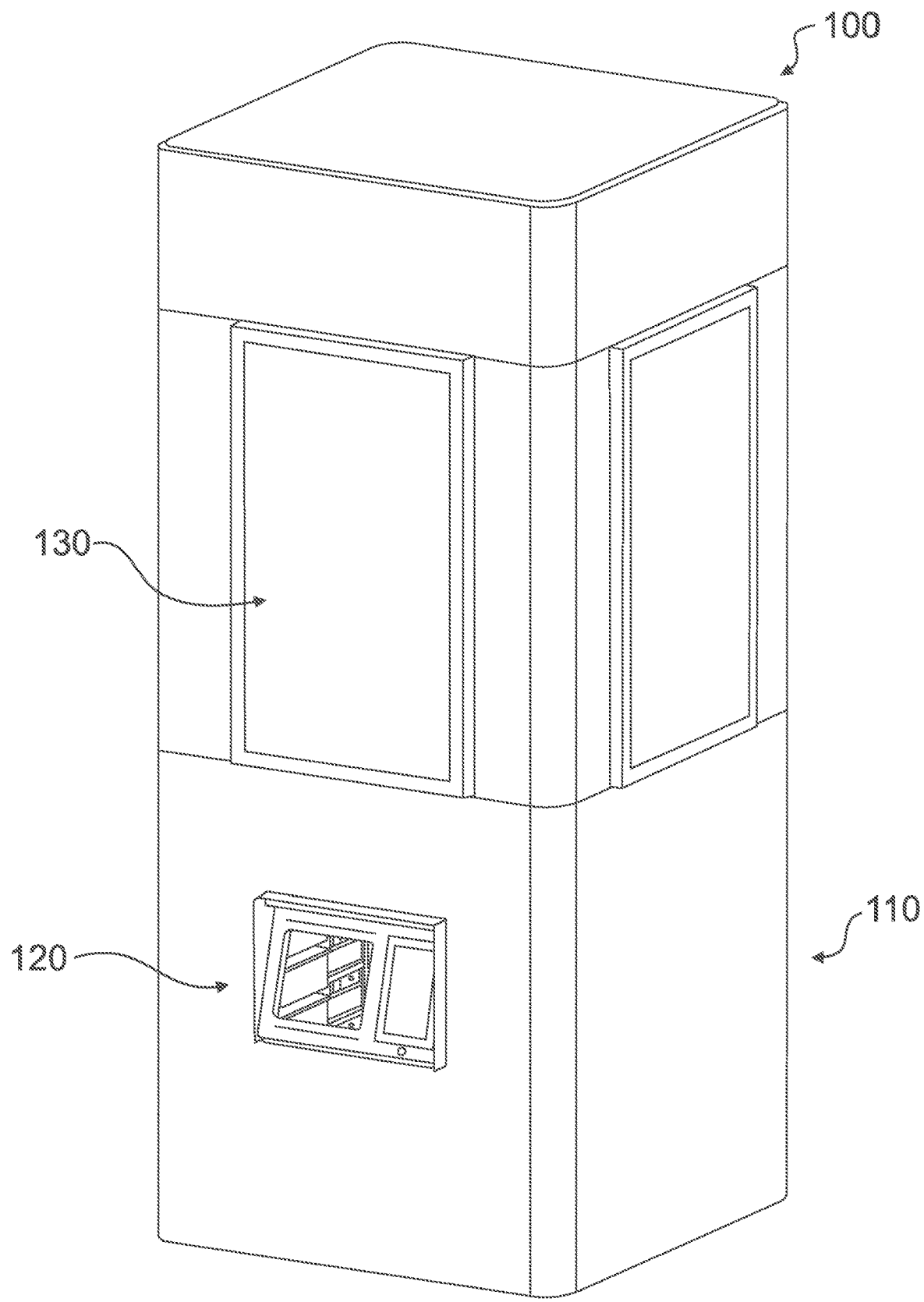
FIG. 1 illustrates a perspective view of an automated storage system in accordance with at least some embodiments.

FIG. 1 illustrates an automated storage system 100 in accordance with at least some embodiments of the present invention. The storage system 100 is a stand-alone apparatus that is constructed to receive and dispense parcels based on inputs from a user through a user interface 120 and to store the parcels inside an enclosure 110. The user interface 120 includes a selectively openable opening for the deposit and retrieval of items and a human-machine-interface, such as a touch-pad, or a machine-machine-interface, such as a data channel, e.g. NFC, Bluetooth, etc., for communication with a terminal device of the user. The enclosure 110 is generally prismatic and clad with a façade. The façade may take the form a layer of protective substance, such as paint or a rubber-based sealant, or constructional elements, such as panels. In the example of FIG. 1 the façade includes a host of profiles attached to the enclosure 110. The profiles have an undulating outer surface for improved strength. The profiles are preferably made from a weather-resistant material such as aluminium or an alloy including aluminium, particularly anodized aluminium. The automated storage system 100 may also host other componentry, such as displays 130, antennas (not illustrated in the drawings), public service announcement equipment (not illustrated in the drawings), etc.

Figure 2:
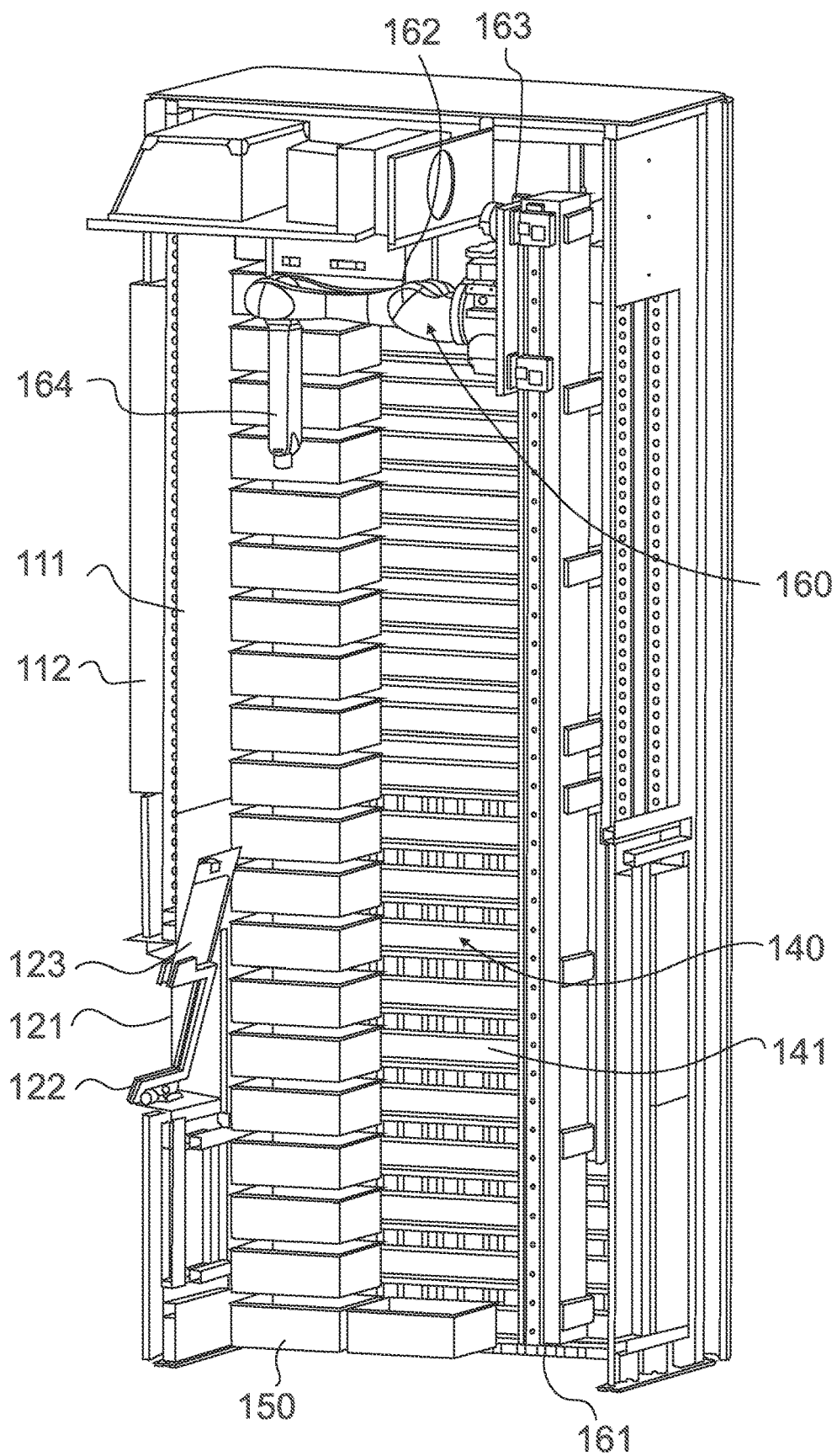
FIG. 2 illustrates a perspective sectioned view of the automated storage system of FIG. 1.

FIG. 2 reveals the inside of the enclosure 110. The enclosure 110 includes a shell 111 which is clad by the afore-mentioned façade 112. The enclosure 110 houses a shelfless support structure 140 for supporting a plurality of containers 150, a large number of containers 150 for storing a respective large number of individual items, a robot 160, and the user interface 120. The enclosure 110 also houses a host of other auxiliary componentry, such as power units, control circuits, etc.

In the illustrated example the enclosure 110 features a generally prismatic shell 111 with four lateral sides, a bottom side, and a top side. The user interface 120 is provided on one lateral side of the enclosure 110. The robot 160 is provided to run on a vertically extending track 161, which is provided on an opposing lateral side in respect to the user interface 120. The track 161 features a linear guide rail that guides a robot 160 up and down the inner space of the enclosure via a carrier 163. The robot 160 features an arm 162 which is articulated such to provide reach into and between all storage positions on the support structure 140. For this purpose the proximal end of the arm 162, which is attached to the carrier 163, may include an articulated joint. The exemplary arm 162 of the embodiment of FIG. 2 features three articulating joints and six axes. A gripper 164 is provided to the distal end of the arm 162 to selectively grab, hold, and release a container 150. The details of the gripper 164 are discussed in here after.

The shelfless support structure 140 features suspenders 141 provided on top of each other on a third or a third and fourth lateral side of the enclosure, e.g. on both sides in respect to the user interface 120. The suspenders 141 take the form of a simple profile which is designed to cooperate with the enclosure 150 to suspend the enclosure from a bordering rim of the enclosure in contrast to conventional shelves that support the enclosures from below. The details of the suspenders 141 are discussed in here after.

Figure 3:
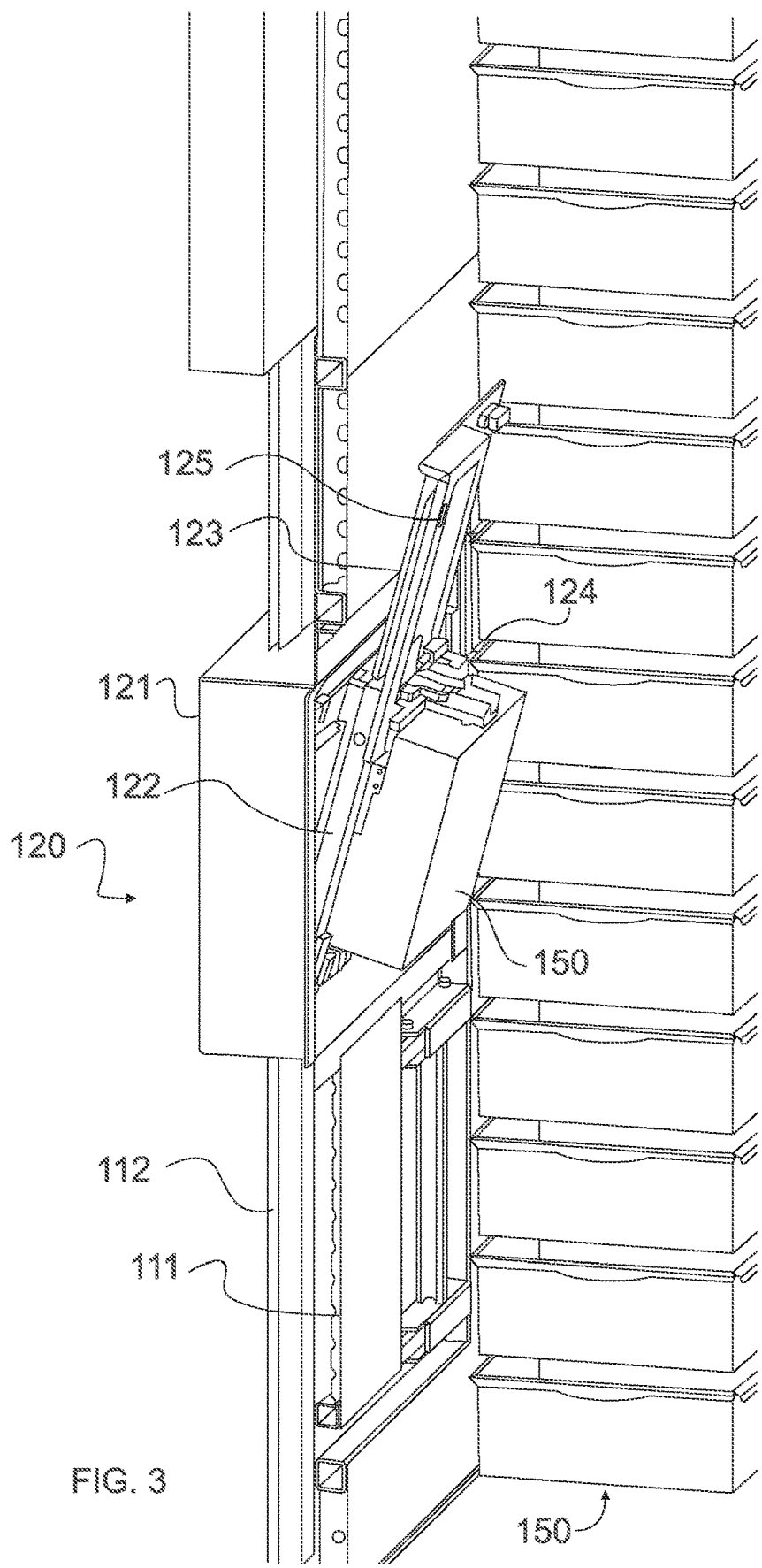
FIG. 3 illustrates a detail view of the user interface of the automated storage system of FIG. 2 from inside the enclosure.
Figure 4:
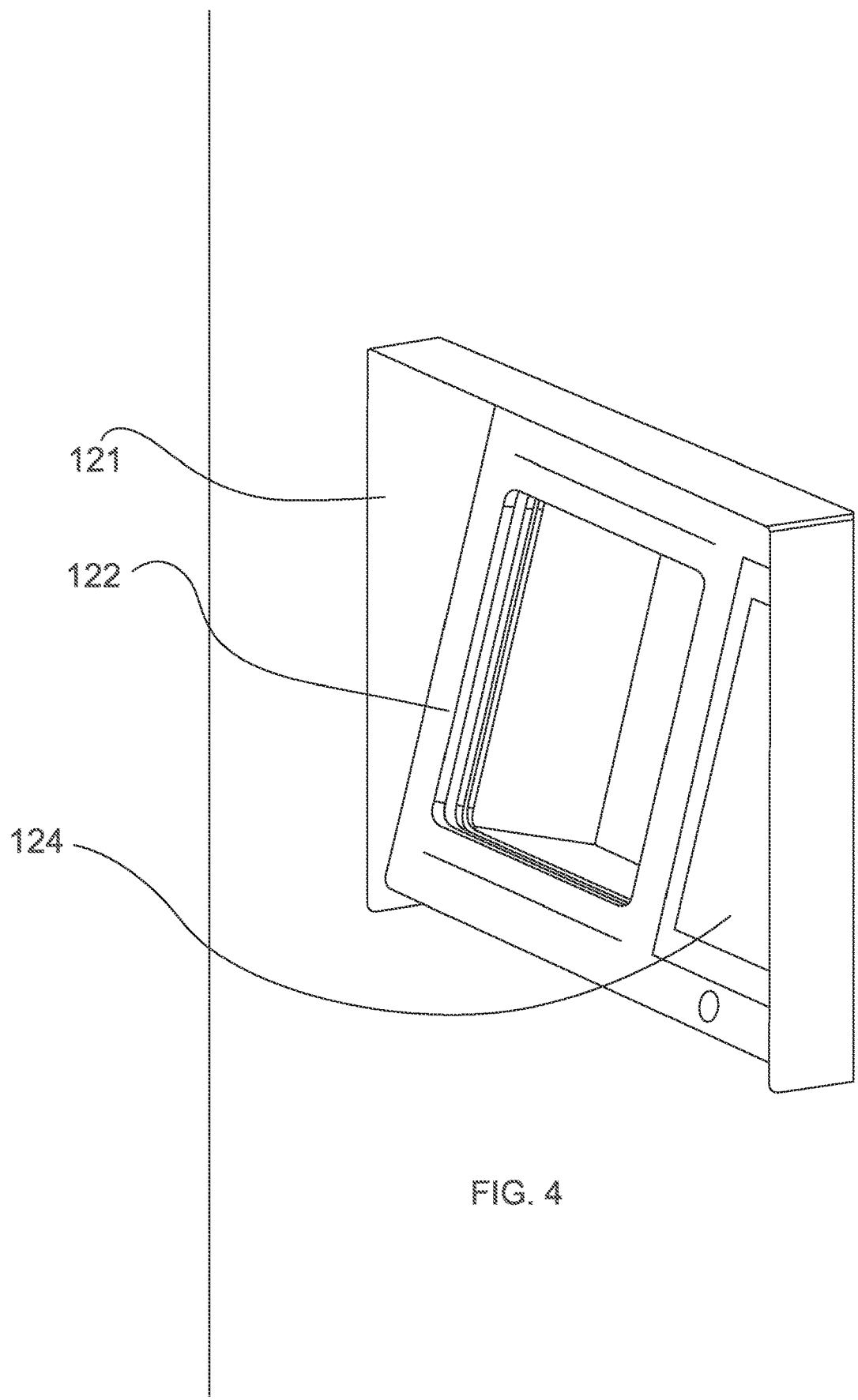
FIG. 4 illustrates a detail view of the user interface of the automated storage system of FIG. 2 from outside the enclosure.

FIGS. 2 to 4 show the construction of the user interface 120. The user interface 120 features a frame 121 which is fitted into a receptive opening in the enclosure 110. The frame 121 has a profile which extends through the shell 111 and façade 112 and provides for a lipped recess for a selectively closable opening and an input and output (i/o in short) device 124. The i/o device 124 may feature a touch screen or other interactive terminal for communication with the user. The user may command the system by entering the details of the stored item for retrieval or depositing purposes. Alternatively or additionally the data i/o device 124 may feature a data interface, such as NFC, Bluetooth, WIFI, etc., for communication with a terminal device of the user for the same purposes. The opening may be selectively opened and closed by a hatch 123. The hatch mechanism includes a slide mechanism 122 that carries the hatch 123. The slide mechanism 122 may simply take the form of a track for holding the hatch 123, which may be a planar plate, in a sliding fashion. The hatch 123 may be manipulated between an open and closed state with an extender 125 which holds the distal end of the hatch 123 and which is adapted to be moved along the track of the slide mechanism. By moving the extender 125 between a bottom and top position, the hatch 123 is moved respectively between a closed state, in which the hatch 123 closes the opening of the user interface 120, and an open state, in which the hatch 123 clears the opening. The slide mechanism 122 is preferably tilted into the enclosure so that the hatch 123 is slid on the inside of the shell 111 above or below the opening of the user interface 120.

FIG. 2 shows the user interface 120 with the hatch 123 in the open state and the extender 125 removed for the sake of simplicity. FIG. 3 shows the user interface 120 with the hatch 123 opened and with a container 150 pressed against the user interface by aligning the rim of the container with the opening of the user interface 120. The arm of the robot has been omitted from FIG. 3 which shows the container 150 in engagement with the gripper 164 of the omitted robot 160. As becomes apparent, the gripper 164 is designed to stay engaged to the container 150 during loading and unloading of the container 150 through the user interface 120. To facilitate that, the hatch 123 is configured to slide past the rim of the container 150 whereas the gripper 164 is configured to grip the container 150 from a side such to leave the plane of the top rim of the container 150 unoccupied. Accordingly, the user interface 120 is particularly convenient to use. Firstly, the backward tilt angle promotes ensuring that the item is placed on the bottom of the enclosure 150 to mitigate the risk of the item being caught in the slide mechanism, i.e. under the hatch 123, during closing. Secondly, by matching the rim of the opening of the user interface 120 with the rim of the container 150, the inner volume of the container 150 may be varied by varying the depth of the container, whereby the same gripper may be used 164 to manipulate containers 150 of various sizes. The inward tilt angle in the slide mechanism allows for such variance in container depth. One may readily appreciate the possibility of replacing the container 150 shown in FIG. 3 with a container having the same footprint and thus rim dimensions but a larger depth (not shown in the FIGURES).

Figure 5A:
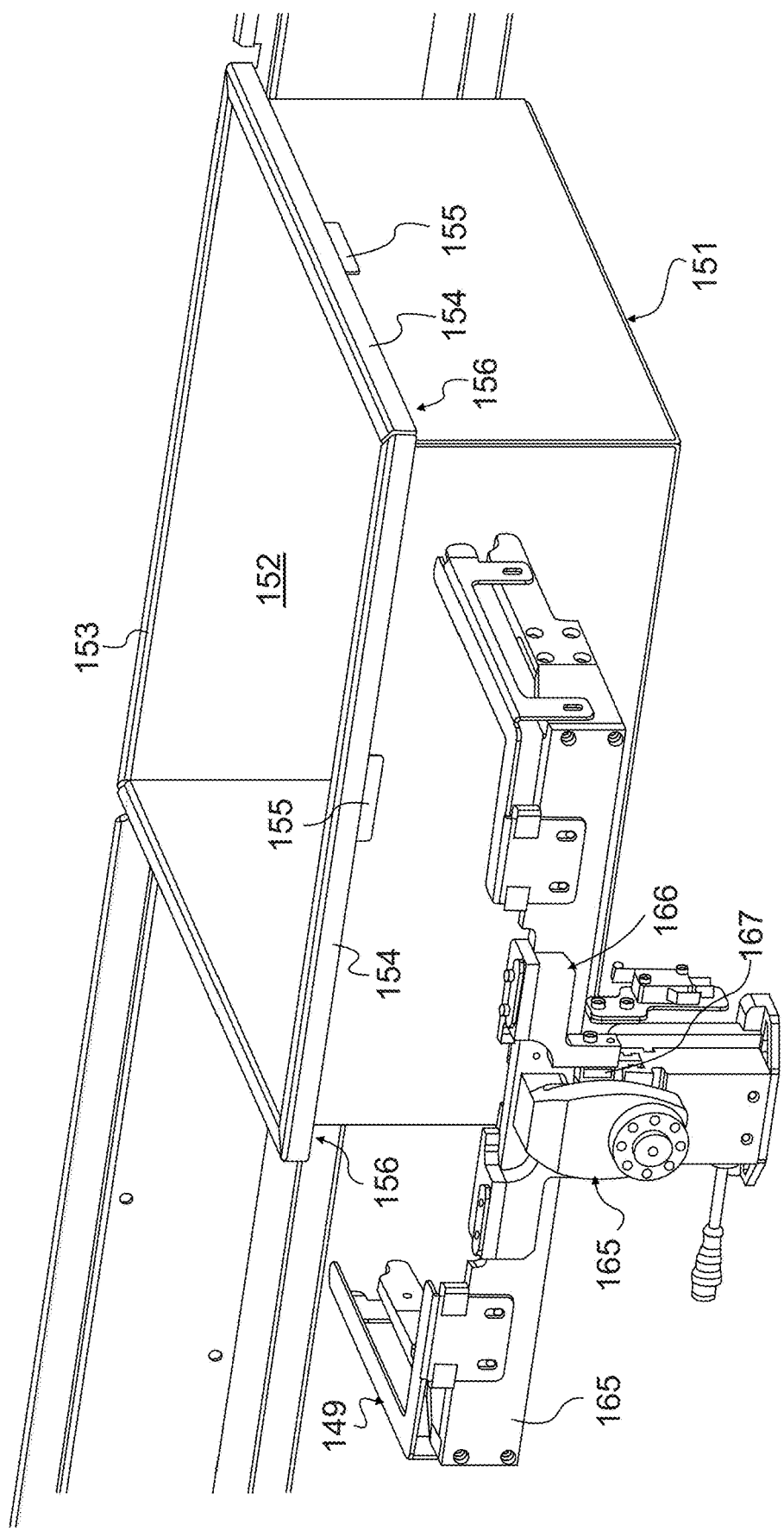
FIG. 5A illustrates a perspective isolation view of the gripper of FIG. 2 approaching a container being held by a suspender.
Figure 5B:
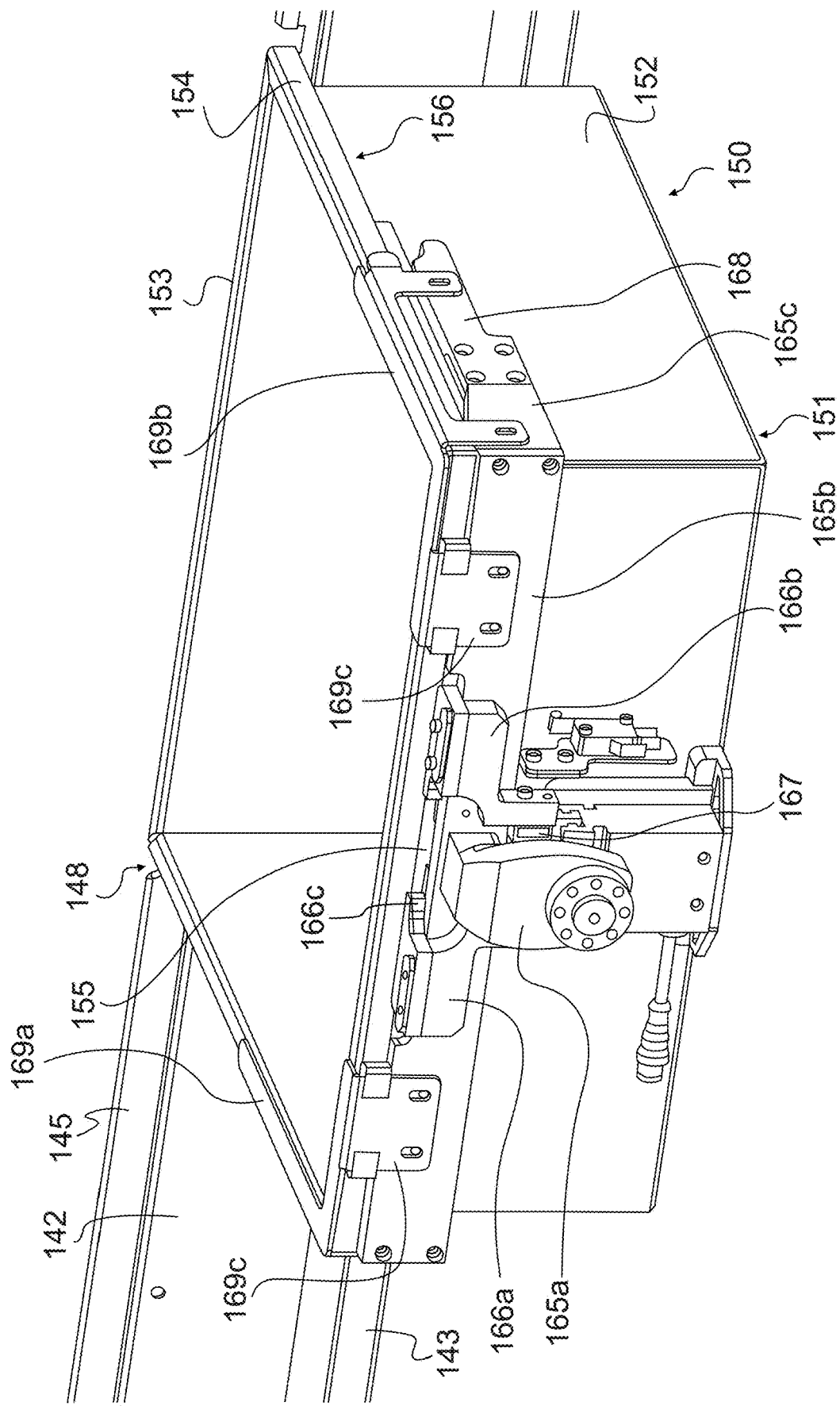
FIG. 5B illustrates a perspective isolation view of the gripper of FIG. 5A in engagement with the container.
Figure 6:
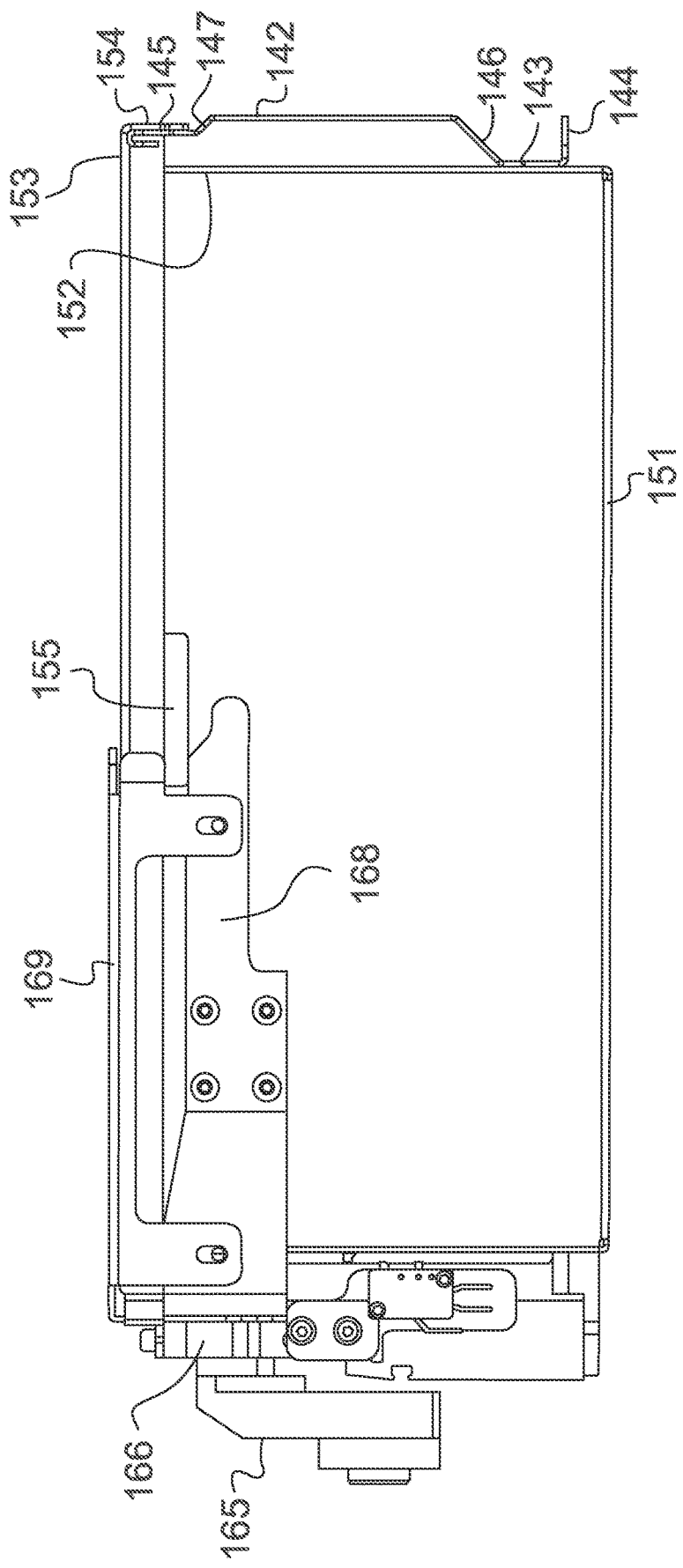
FIG. 6 illustrates a partially sectioned side elevation view of the gripper of FIG. 5C.

Turning now to FIGS. 5A to 5C that show the details of the gripper 164 and container 150. Let us first study the container 150. As shown in the FIGURES, the enclosure 150 exhibits a generally prismatic shape. The base 151 of the enclosure 150 is quadrilateral, specifically quadrangular, but naturally other shapes are also foreseeable. A casing 152 extends from the base 151 from all four sides. The casing 152 includes four side walls that are oriented in a right angle in respect to the base 151. The base 151 extends across an area a center point and an imaginary center axis that extends through the center point. The casing 152 therefore extends from the base 151 in a direction having a component that is parallel to the center axis. It is preferred that the casing 152 extends in a direction that is very close to parallel in respect to the center axis. While slight deviations from the parallel extension are possible, the prismatic shape is preferred for volumetric efficiency. The casing 152 may in other words have a slight draft for promoting detachment from a mold, if the enclosure 150 is a cast product. A suitable draft angle may be in the range of one to five degrees, particularly three degrees. It is, however, to be noted that the component of the extension that is parallel to the center axis is dominant. While the side walls of the casing 152 are preferably planar, curved, rounded, chamfered, or otherwise modified shapes are also foreseen. The container 150 may also be produced from a sheet of metal, such as stainless steel or an aluminum alloy, which is cut to form, bent to form the container shape, and then laser welded shut along the seams.

The top end of the casing 152 that is at the opposing end of the bottom end, which is attached to the base 151, delimits the opening providing access into the inner volume of the container 150. The top end includes a rim 153. The rim 153 extends outward from the top end, i.e. away from the center axis of the container 150. The rim 153 need not extend perpendicularly in respect to the center axis as long as the extension includes a component of extension that is perpendicular in respect to the center axis. The container 150 further features a skirt 154 which extends from the rim 153. The purpose of the skirt 154 is to create a gripping space 156 under the rim 153 so as to hold on to a suspender 141 of the support structure 140. On the other hand, the skirt 154 has a tab 155 extending along the skirt 154 for providing a locking action in respect to the gripper 164. The skirt 154 faces the bottom of the container 150 meaning that it extends in a direction which has a dominant component parallel to the center axis of the container 150. According to the illustrated embodiment the skirt 154 extends parallel to the casing 152, i.e. in a right angle in respect to the rim 153. Accordingly, the skirt 154 forms a peripheral gripping space with the casing 152 and the rim 153. As mentioned, the skirt 154 includes at least one tab 155. The tab 155 is an increased section of extension, whereby the dimension in which the skirt 154 extends from the rim 153 varies along the skirt 154. The skirt may include one or several such tabs on one or several sides of the container 150. According to the illustrated example, there is one tab 155 located on each side of the container 150, whereby the orientation of the container 150 may be changed within the automated storage system.

FIGS. 5A to 5C and 6 show the container 150 being suspended by a suspender 141 of the support structure 140. The suspender 141 is preferably a simple profile that is attached to the inner surface of the shell 111 of the enclosure 110. The profile is designed to allow for permanent attachment to the shell 111 and repetitively removable attachment to the container 150. To facilitate the permanent attachment, the profile features a body 142 which extends laterally across the suspender 141 and which is placed centrally along the vertical extension of the suspender 141. The body 142 is preferably planar. To facilitate the removable attachment to the container 150, the suspender 141 features a vertically extending lip 145 placed above the body 142 in the vertical dimension and displaced on one side thereof in the depth dimension to provide a gap between the lip 145 and the shell 111 of the enclosure 110 that supports the suspender 141. The gap is large enough to account for the thickness of the skirt 154. The terminal end of the lip 145 is preferably rounded to promote smooth engagement with the container 150. The lip 145 is designed to enter into the gripping space 156 and to support the container 150 from the rim 153. The inner surface of the skirt 154 rests against the lip 145. There is a transition 147 between the body 142 and the lip 145 connecting the two diagonally. For the sake of keeping the container 150 in an upright orientation during storage, the suspender 141 preferably includes a shoulder 143 placed below the body 142 in the vertical dimension and displaced on said one side thereof in the depth dimension to support the casing 152 of the container 150 during storage. The shoulder 143 is pronounced from the body 142 enough to account for the depth of the rim 153 of the container 150. The suspender 141 further includes notches provided along the lip 145 to receive the skirt 154 of the containers 150. The notches 148 are dimensioned to facilitate the skirts 154 of two adjacent containers 150 being placed side-to-side on the suspender 141 with a small clearance between the two.

FIGS. 5A to 5C show the container being approached by, engaged with, and locked to the gripper 164 of the robot 160. The gripper 164 has a shape of a general C shape and is configured to engage three sides of the generally prismatic container 150. The gripper 164 has a body 165 which is designed to form a connection between the robot arm 162, the container 150, and the actuating elements of the gripper 164. The body 165 has a transversally extending piece 165*b* which is aligned with the side of the container 150 which opposes the suspender 141. The transversally extending piece 165*b* is designed to engage with the bottom edge of the skirt 154 for supporting the container 150. Connected to the transversally extending piece 165*b* is a connector 165*a* with an attachment interface to the arm 162 of the robot and a proximity switch for sensing the presence of the container 150 through engagement with the casing 152. A slide lock 166 is connected to the body 165 in a sliding manner. The slide lock 166 has two opposing slides 166*a*, 166*b* motivated by actuators 167 to be slid in respect to the body between an open state shown in FIG. 5B and a closed state shown in FIG. 5C. In the open state the slides 166*a*, 166*b* are spaced apart to allow the introduction of the slides 166*a*, 166*b* into the gripping space 156. In the closed state the slides 166*a*, 166*b* are in proximity with each other to grip the tab 155 from the sides and to extend behind the tab 155 in the gripping space 156. For this purpose the slides 166*a*, 166*b* of the slide lock 166 have claws 166*c* that selectively grab the tab 155. The body 165 is shaped to facilitate the sliding movement by including the necessary sliding guides for the slides 166*a*, 166*b*. Indeed, the slide mechanism 166 of the gripper 164 is configured to slide along the skirt 154 of the enclosure 150.

To further secure the gripper 164 to the container 150 the gripper 164 may include parts that engage the container 150 also from the lateral sides in addition to the side opposing the suspender 141. Accordingly the body 165 has two longitudinally extending pieces 165*c* on both sides of the transversally extending piece 165*b*. The longitudinally extending pieces 165*c* are designed to engage with the bottom edge of the skirt 154 at the sides of the container 150 for support. Connected to the body 165 is a brace 169 for engaging the rim 153 of the container 150, i.e. the top edge thereof. The brace 169 is designed to slide over and along the rim 153 so as to carefully align the gripper 164 with the container 150 during approach and engagement. The brace 169 has a two L-shaped frames 169*a*, 169*b* connected to the opposing longitudinal pieces 165*c* and to the transversal piece 165*b* of the body 165 with legs 169*c* that flank the skirt 154 of the container 150. The leading edge of the brace 169 is preferably relieved for smooth contacts with the container 150.

The gripper 164 may also include a support finger 168 provided to the longitudinal pieces 165*c*. The support fingers 168 together with the frames 169*a*, 169*b* provide support container 150 during lifting and by preventing the container 150 from tipping over, if the container 150 has a center of gravity far from the body 165 due to uneven loading. The support fingers 168 emphasize the fact that the gripper has a shape resembling the letter C when viewed from above.

The described attachment interface between the container 150, suspender 141, and the robot 160 provides for a simple and convenient way of manipulating a large number of containers in an automated storage system 100. Upon deposit of an item into the system 100, the user summons a container 120 to the user interface 120 by entering a respective command through the i/o device 124. The robot 160 is run to a vacant container 150 (FIG. 5A) into engagement with the container 150 such that the body 165 is engaged with the skirt 154 and with the rim 153 fitted under the brace 169 (FIG. 5B). The slide lock 166 is then manipulated into a closed state, wherein the slides 166*a*, 166*b* grip the tab 155 of the skirt 154 (FIG. 5C).

With the container 150 secured to the gripper 164, the robot 160 lifts the container 150 off the suspender 141 enough for the skirt 154 to clear off notches 148. The container 150 is then transported by the robot 160 to the user interface 120, where the rim 153 of the container 150 is aligned with the closed opening of the user interface 120. With the container 150 in place, the hatch 123 is opened by running the extender 125 to the extended position along the track of the slide mechanism 122 (FIGS. 3 and 4).

After the user has inserted the item to be stored into the container 150, he gives a command through the i/o device 124 to confirm that the item is ready for storage. The hatch 123 closes by running the extender 125 to the retreated position along the track of the slide mechanism 122. Afterwards, the robot 160 returns the container to the same suspender 141 or to another vacant position on the support structure 140. The robot 160 then positions the container 150 above the vacant position, aligns the skirt 154 with the receptive notches 148, and lowers the container 150 into place. The slide lock 166 is then opened by sliding the slides 166*a*, 166*b* away from one another, whereby the slide lock 166 is cleared from the tab 155. The gripper 164 is then retracted from the container 150, where after the robot 160 may be run to a waiting position or to serve another deposit or retrieval process.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No | Feature | No | Feature |
|---|---|---|---|
| 100 | automated storage system | 147 | transition |
| 110 | enclosure | 148 | notch for skirt |
| 111 | shell | 150 | container |
| 112 | facade | 151 | base |
| 120 | user interface | 152 | casing |
| 121 | frame | 153 | rim |
| 122 | slide mechanism | 154 | skirt |
| 123 | hatch | 155 | tab |
| 124 | i/o device | 156 | gripping space |
| 125 | extender | 160 | robot |
| 130 | display | 161 | track |
| 140 | support structure | 162 | arm |
| 141 | suspender | 163 | carrier |
| 142 | body | 164 | gripper |
| 143 | shoulder | 165 | body |
| 144 | leg | 165a | connector |
| 145 | lip | 165b | transversal piece |
| 146 | transition | 165c | longitudinal piece |
| 166 | slide lock | 169 | brace |
| 166a | slide | 169a | frame |
| 166b | slide | 169b | frame |
| 167 | actuator | 169c | leg |
| 168 | support finger | | |

The invention claimed is:

1. An attachment interface for attaching a container to a suspender of a shelfless support structure of an automated storage system, wherein:
the container comprises:
a base extending across an area that has a center point and an imaginary center axis extending through the center point;
a casing with a bottom end connected to the base and a top end opposing the bottom end and defining an opening for accessing the container, which casing extends from the base in a direction having a component parallel to the center axis;
a rim, which extends from the top end of the casing away from the center axis, and
a bottom-facing skirt which extends from the rim,
the shelfless support structure comprises a plurality of suspenders configured to be attached to and inside of an enclosure of the storage system in a mutually superposed configuration, wherein each suspender comprises:
a body having a height in a first Cartesian dimension (X) defined between a top end and a bottom end and a width in a second Cartesian dimension (Y), and
a lip configured to be introduced to a gripping space defined by the casing, rim and skirt of the container,
wherein:
the lip of the suspender extends from a top end of a body of the suspender above and towards one side thereof;
each suspender comprises a plurality of notches provided to the lip for accommodating respective skirts of a plurality of containers, and
each suspender comprises a shoulder for engaging casings of the plurality of containers, the shoulder extending from the bottom end of the body below and towards said one side thereof.

2. The attachment interface according to claim 1, wherein the skirt comprises a tab extending in the same direction as the skirt, whereby the extension of the skirt varies along the skirt in the dimension, in which the skirt extends from the rim.

3. The attachment interface according to claim 2, wherein at least one such tab is provided on each side of the container.

4. The attachment interface according to claim 3, wherein the rim and skirt extend around the entire top end of the casing.

5. The attachment interface according to claim 2, wherein the container is generally prismatic.

6. The attachment interface according to claim 2, wherein the container is symmetrical about two mutually orthogonal symmetry axes extending across the container when viewed along the center axis.

7. The attachment interface according to claim 1, wherein the container is generally prismatic.

8. The attachment interface according to claim 7, wherein the container is symmetrical about two mutually orthogonal symmetry axes extending across the container when viewed along the center axis.

9. The attachment interface according to claim 1, wherein the rim and skirt extend around the entire top end of the casing.

10. The attachment interface according to claim 1, wherein the container is symmetrical about two mutually orthogonal symmetry axes extending across the container when viewed along the center axis.

11. The attachment interface according to claim 1, wherein the base is planar, whereby the imaginary center axis is a normal of the base.

12. The attachment interface according to claim 1, wherein the skirt extends from the rim parallel to the center axis.

13. An automated storage system comprising:
an enclosure;
a user interface provided to the enclosure and comprising a selectively openable opening for the deposit and retrieval of items;
a shelfless support structure contained in the enclosure for storing a plurality of containers;

a plurality of containers housed on the support structure for storing the items, and a robot provided to the inside of the enclosure for moving the containers between the selectively openable opening and the support structure, wherein:

the containers in said plurality of containers comprise:

a base extending across an area that has a center point and an imaginary center axis extending through the center point;

a casing with a bottom end connected to the base and a top end opposing the bottom end and defining an opening for accessing the container, which casing extends from the base in a direction having a component parallel to the center axis;

a rim, which extends from the second end of the casing away from the center axis, and a bottom-facing skirt which extends from the rim, whereby a gripping space is formed between the casing, rim and skirt of the container;

the shelfless support structure comprises a plurality of suspenders attached to and inside of an enclosure of the storage system in a mutually superposed configuration, wherein each suspender comprises:

a body having a height in a first Cartesian dimension (X) defined between a top end and a bottom end and a width in a second Cartesian dimension (Y);

a lip configured to be introduced to respective gripping spaces of the plurality of containers, the lip extending from the top end of the body above and towards one side thereof;

a plurality of notches provided to the lip for accommodating respective skirts of the plurality of containers, and a shoulder for engaging casings of the plurality of containers, the shoulder extending from the bottom end of the body below and towards said one side thereof, and the robot comprises an articulated arm and a gripper at a distal end of the articulated arm.

14. The automated storage system according to claim 13, further comprising:

a vertically extending track, and a carrier provided movably to the track, wherein the arm is attached at a proximal end to the carrier.

15. The automated storage system according to claim 13, wherein:

the enclosure has a quadrilateral cross-section;

the user interface is provided on a first side of the enclosure;

the robot is provided on a second side of the enclosure opposing the first side;

a first such support structure is provided on a third side of the enclosure, and a second such support structure is provided on a fourth side of the enclosure opposing the third side.

16. The automated storage system according to claim 13, the gripper being configured for selective gripping of a container and comprising a body configured for engagement of a top end of the container, wherein:

the gripper comprises a slide lock provided to the body and configured to selectively secure the gripper to the top end of the container, the slide lock is configured to be inserted to the gripping space, and the slide lock is provided movably to the body and configured to be manipulated between:

a released configuration, in which the slide lock is disengaged from a tab extending from the skirt of the container, and a locked secured configuration, in which the slide lock is engaged to the tab.

17. The automated storage system according to claim 16, wherein the slide lock is configured to slide along one side of the container.

18. The automated storage system according to claim 17, wherein the body of the gripper comprises:

a transversal piece, which comprises the slide lock, for engaging one side of the generally prismatic container, and two longitudinal pieces, which extend from opposing ends of the transversal piece for engaging two respectively opposing sides of the generally prismatic container.

19. The automated storage system according to claim 16, wherein the gripper has a shape of a general C shape and is configured to engage three sides of the generally prismatic container.

* * * * *

UNITED STATES PATENT AND TRADEMARK OFFICE
CERTIFICATE OF CORRECTION

| | | |
|---|---|---|
| PATENT NO. | : 12,471,707 B2 | Page 1 of 1 |
| APPLICATION NO. | : 17/916042 | |
| DATED | : November 18, 2025 | |
| INVENTOR(S) | : Ykä Huhtala et al. | |

It is certified that error appears in the above-identified patent and that said Letters Patent is hereby corrected as shown below:

On the Title Page

Item (22) the PCT filing date March 3, 2021 should be March 30, 2021.

Signed and Sealed this
Third Day of February, 2026

John A. Squires
*Director of the United States Patent and Trademark Office*